United States Patent [19]

Hull et al.

[11] Patent Number: 5,217,387
[45] Date of Patent: Jun. 8, 1993

[54] WATER RESISTANT EXTENSION CORD CONNECTOR HOUSING

[76] Inventors: Harold L. Hull, 401 Canyon Way, #43, Sparks, Nev. 89434; Jackie J. Hoff, 133 Ashley Way, Reno, Nev. 89511; Kenneth N. Watkins, 656 Spokane St., Reno, Nev. 89512; Bill D. Alkire, 115 W. Gepford Pkwy., Sun Valley, Nev. 89433

[21] Appl. No.: 875,096

[22] Filed: Apr. 28, 1992

[51] Int. Cl.$^5$ ............................................. H01R 13/62
[52] U.S. Cl. ............................... 439/367; 439/369; 439/892
[58] Field of Search ............... 439/367, 369, 455, 465, 439/588, 466, 467, 371, 521, 523, 892, 910

[56] References Cited

U.S. PATENT DOCUMENTS

| | | | |
|---|---|---|---|
| 817,346 | 4/1906 | Stakelbeck | 439/455 |
| 3,014,194 | 12/1961 | Berglund | 439/367 |
| 3,020,518 | 2/1962 | Campihez et al. | 439/910 |
| 3,270,312 | 8/1966 | Olsen | 439/367 |
| 3,344,393 | 9/1967 | Hendee | 439/369 |
| 4,204,738 | 5/1980 | Tillorpn | 439/369 |
| 4,643,505 | 2/1987 | House et al. | 439/367 |
| 4,869,683 | 9/1989 | Nelson | 439/367 |

FOREIGN PATENT DOCUMENTS 2202692  9/1988  United Kingdom ............... 439/367

Primary Examiner—Larry I. Schwartz
Assistant Examiner—Hien D. Vu

[57] ABSTRACT

Disclosed is an apparatus and method for holding, water-proofing and retaining an electrical connection between two electrical power cords which includes a hinged housing defining two openings with the openings receiving inserts to accommodate various sizes and shapes of electrical cords. The inserts are adjustable to allow the user to snug them up against both connectors within the housing. Also, disclosed is a sheath made of rubber or NEOPRENE which is installed over the connection before inserting the connections in the housing to substantially water-proofing the connections.

2 Claims, 2 Drawing Sheets

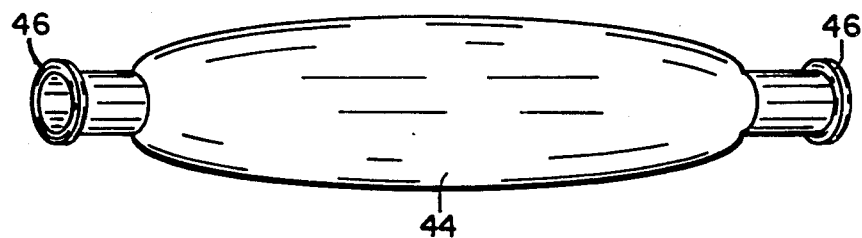
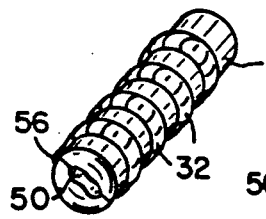
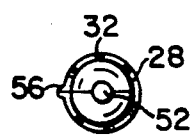
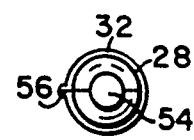
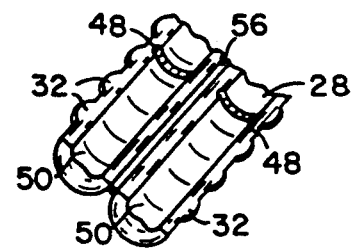
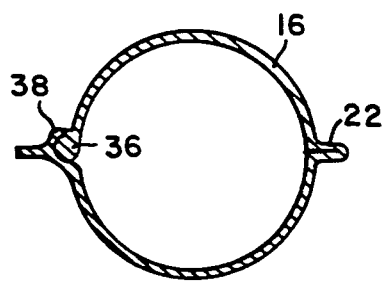
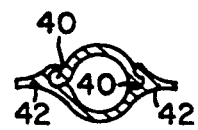
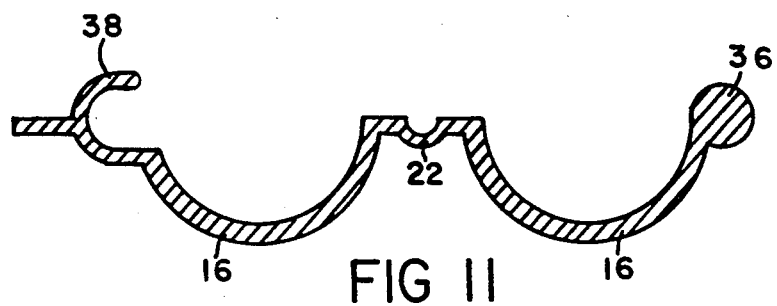

WATER RESISTANT EXTENSION CORD CONNECTOR HOUSING

FIELD OF THE INVENTION

This invention relates to the interconnection of electrical extension cords, and more particularly to a water resistant receptacle to house the male and female connector.

BACKGROUND OF THE INVENTION

The interconnection of several flexible extension cords to transmit power from a source, such as an electrical outlet, to a device is very common. In a household environment, several extension cords may be interconnected to provide power to a device, such as a lawnmower or hedge trimmer for use at a distance from a power outlet. Interconnected extension cords may also be used on commercial applications, particularly by construction workers operating hand tools or other devices operated remotely from a power outlet.

The typical extension cord includes male and female plugs interconnected by a flexible cable. In many extension cords, the female plug of one cord is connected to the male plug of another cord by receiving spade type conductors from the male plug and urging internal conductors in contact therewith. On many occasions, the application of tension to a cable of a connected pair of extension cords will induce separation or disconnection of the conductors in the plugs and prevent the transmission of power. This naturally results in inconvenience and expense caused by the necessity to reconnect the plugs.

In certain industrial applications, heave duty electrical conductor cords capable of handling 220-400 volts, and having mating terminals are coupled, and the coupled region is exposed to weather conditions or utilized in a harbor environment where immersion in water is likely. In such conditions of use, penetration of the coupling by water or water-borne contaminates can disrupt the electrical system and may lead to damage of the terminals, potentially dangerous sparking and possible electrocution of personnel.

Numerous housings have earlier been disclosed for the purpose of preventing inadvertent separation of coupled electrical terminals, and some of said housings are further intended to prevent entrance of water into the coupling.

In the past, several attempts have been made to alleviate this problem. The connected extension cords may be tied in a knot adjacent the plugs. However, this caused fatigue in the cable and may result in cord failure.

Examples of other attempts to solve these problems are disclosed in U.S. Pat. Nos. 4,643,505 to House, issued Feb. 17, 1987, 4,869,683 to Nelson, issued Sep. 26, 1989, 3,048,810 to Steen, issued Apr. 7, 1962 and 3,183,302 to Wochner & Toediman, issued May 11, 1965.

These examples and others are limited in their individual functions and the present invention addresses these and other functions in a unique and unobvious manner heretofore undisclosed.

SUMMARY OF THE INVENTION

It is therefore a primary object to provide a receptacle to receive the mating ends of two separate extension cords.

It is a further object to provide a receptacle which will accept a variety of styles and sizes of the mating ends of two separate extension cords.

Still another object is to make a receptacle which is resistant to snags or obstacles such as the edges of roofs, abutments, edges, tree limbs or the like, when dragging the cord and receptacle over them.

Yet another important object is to provide inserts at both ends of the receptacle to receive various sizes and shapes of cords such as zip cords or round cords of varies sizes.

Another important object is to make the inserts in a manner which cooperates with the receptacle in order to locate the inserts in multiple positions, thus, causing the inner ends of the inserts to come into contact with the cord ends of the plug to securely hold the plugs together.

Another object is to provide a water tight sheath or balloon which captures both end of the cords and not only assists in holding them together but makes them resistant to water or moisture.

Still another object is to make the receptacle with a "living hinge" that is flexible so that the receptacle can be opened and closed many times without breaking.

Yet another important object is to provide a sealed lip around the entire perimeter of the receptacle to further protect the plugs from water, moisture, mud, etc.

Another object is to design the receptacle in such a manner as to be able to injection mold not only the receptacle but also varied inserts in the same mold.

Yet another object is to teach the user a method of placing the balloon or sheath over one of the plugs, inserting the mating plug, sliding the balloon or sheath over the second plug, placing the now sheathed plugs into the receptacle, selecting the proper matching inserts, inserting the inserts into the receptacle in a selected position to hold the mating plugs together, closing the matching inserts around the cords, and then closing the receptacle to capture and hold the plugs, inserts and cords in a secure water and moisture resistant manner.

The construction and method of operation of the invention with additional objects and advantages thereof will be best understood from the following description of specified embodiments when read in connection with the accompanying drawings.

BRIEF DESCRIPTION OF THE DRAWINGS

FIG. 4, is a perspective view of a sheath or balloon.

FIG. 5, is a perspective view of a typical insert showing a zip cord cavity.

FIG. 6, is an end view of an insert showing a round cord cavity.

FIG. 7, is an end view of an insert showing a smaller round cord cavity.

FIG. 8, is a partial perspective view of the insert of FIG. 5 in an open position.

FIG. 9, is a section taken at 9—9 of FIG. 1.

FIG. 10, is a section taken at 10—10 of FIG. 1.

FIG. 11, is a section taken at 11—11 of FIG. 3.

DETAILED DESCRIPTION OF THE DRAWINGS

Figure 1:
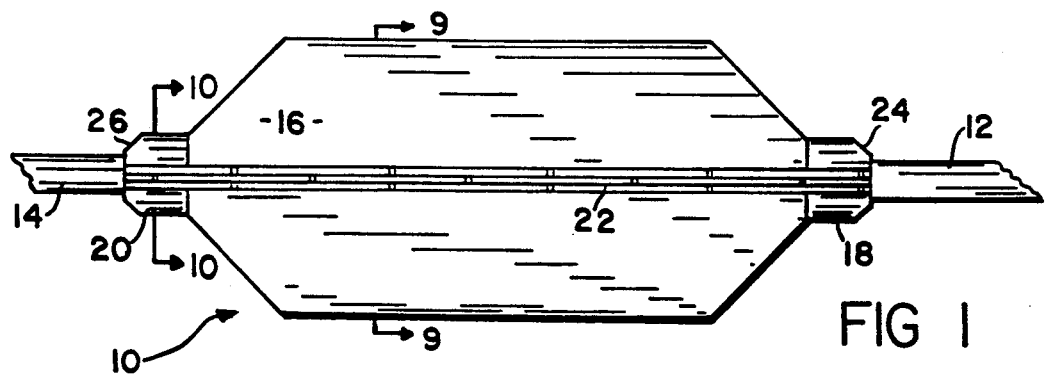
FIG. 1, is a side view in elevation of the preferred embodiment in a closed position.

Referring now in detail to the drawings wherein like referenced characters refer to like elements throughout the various drawings, 10 as shown in FIG. 1 is an overview of the receptacle showing the extension cord 12 and extension 14 entering the main body 16 of the receptacle 10 through jaw members 18 and 20 respectively, jaw members 18 and 20 having on their outer edges sloping contours 24 & 26 with 22 being a molded hinge member.

Figure 2:
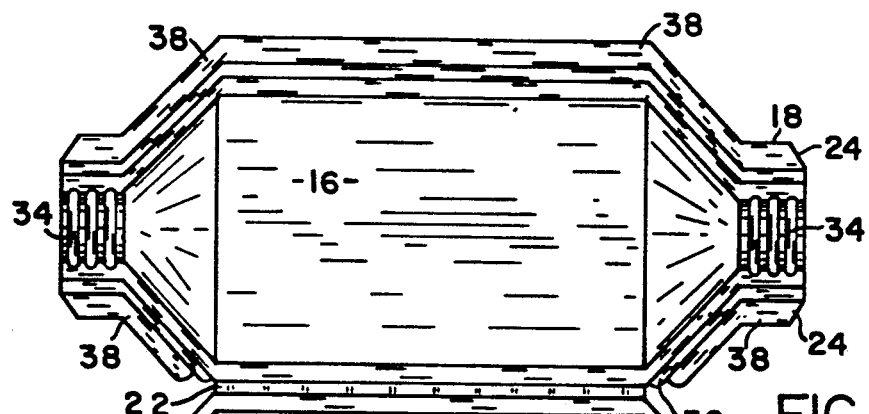
FIG. 2, is a top view of the receptacle in an open position showing the extension cord plugs with ghost lines and including inserts in a closed position with the connectors encased in a rubber sheath.

In FIG. 2, the receptacle 10 is shown in an open position with extension cord 12 terminating in a male connector 27 and cord 14 terminating in a female connector 25, both shown in a ghost position and cord 12 & 14 being captured by inserts 28. Inserts 28 are shown in place in the jaw members 18 and 20 respectively, in a closed position and with their ring-like detents 32 cooperating and being captured by mating ring-like indents 34 in jaw members 18 & 20, respectively.

The inserts 28 in FIG. 2 are shown for the sake of clarity, in a position somewhat pulled back from the cord ends of the female and male connectors 25 & 27, respectively, but in actual practice may be located in a more inward position abutting the ends of connectors 25 & 27, respectively, to hold connectors 25 & 27 respectively, in a more tightly secured position which cannot be easily pulled apart, thereby, keeping the prongs 30 of male connector 27 firmly inserted into the internal electrical receiving elements (not shown) of female connector 25.

Figure 3:
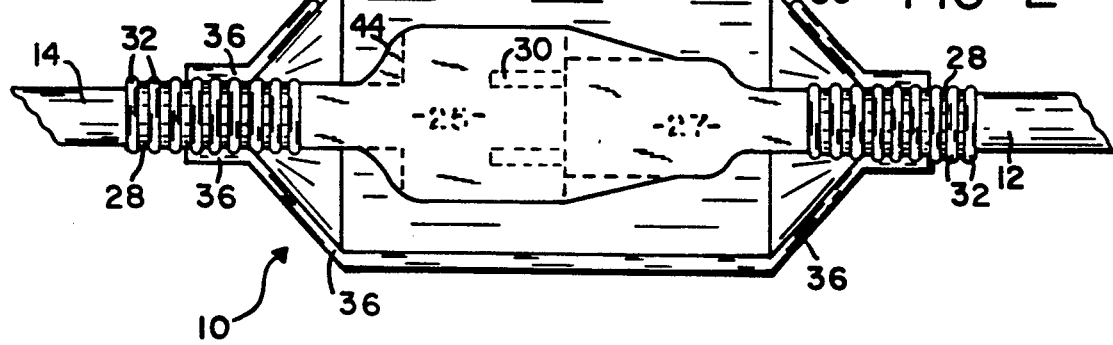
FIG. 3, is a partial perspective view showing one end of the receptacle in an open position.

In FIGS. 2 & 3, 36 is a lip which cooperates with the internal contour of a second lip 38 as more clearly defined in FIGS. 9 & 11 respectively. FIG. 10 shows a section taken at 10—10 of FIG. 1 with lips 40 cooperating with lips 42 to form a closed position of jaw members 18 and 20 respectively.

In FIGS. 2 & 4, a sheath or balloon like structure 44 is disclosed which may be made of a resilient material such as rubber or NEOPRENE and when placed over the connectors 25 & 27 respectively, at assembly, further protects the connectors from moisture or water and making the connection virtually water proof. The ends of the sheath or balloon like structure 44, terminate in a ring-like detent 46, which cooperate with mating ring-like internal indents 48 of the various inserts 28.

FIG. 5 shows an internal cavity 50 in insert 28, which is shaped and contoured to capture the outside surface of an electrical cord such as a "zip" cord (not shown) which is used in common household cords such as appliances, lamps and extension cords or the like and FIG. 8 shows the cavity 50 with insert 28 being in an open position prior to inserting the "zip" cord (not shown).

FIGS. 6 & 7 depict other inserts with their cavities 52 & 54, respectively, cooperating with the outer surfaces of round electrical cords of various circumferences. The various inserts 28 may be made of the same material as the body 16 of the receptacle 10, such as plastic and made at the same time in the same mold and may have a "living hinge" 56.

It will now be seen that we have provided a molded receptacle for holding and capturing the mating connectors of two separate extension cords or the like which will accept a variety of styles and sizes of cords and connectors and which hold together the cords and connectors in a secure manner even under the severe stress of pulling the cords and receptacle over obstructions such as roof edges, abutments, tree limbs or the like and due to the sloped contours of the protruding cord jaw members, will be snag resistant.

Also, we have provided a means of choice to allow the various inserts to be adjusted up tight against the connectors to hold them in a secure mating position and have also provided a means to make the connection virtually water tight by enclosing the connections prior to assembly into the receptacle, in a flexible, resilient, rubber or NEOPRENE sheath or balloon which ends cooperate with the inserts and receptacle to seal the connection and protect it from moisture, water, mud or the like.

We have further provided means to close and open not only the receptacle but also the inserts with a "living hinge" which is molded at the time of manufacture and requires no assembly but may be flexed many times in actual use and is wear and tear resistant.

We have also provided a mating lip system which encompasses all the edges of the receptacle except the hinge area, and the receptacle may readily be "snapped" into a closed or open position at will by applying pressure at appropriate pressure points.

Also, we have taught a method by which the user can, by following the appropriate steps, insulate and capture the electrical connections of two separate extension cords or the like to keep them water tight and resistant to being pulled apart under stress.

What we claim and wish to secure by letters patent is:

1. An apparatus for securing together electrical cords having mutually engaged electrical contacting devices comprising; a housing having a lower section and an upper section hingedly attached thereto having a mating relationship, said upper section and said lower section cooperatively defining a space for receiving a socket of a first electrical cord and a plug of a second electrical cord and further defining two openings into said space for acceptance of multiple inserts, said openings being in the form of two flexible mating jaw members having a first and second position, said jaw members being integrally molded on said lower and upper sections adjacent said openings, said first position of said jaw members being open, said second position being closed forming second spaces for acceptance of said inserts between said jaw members, said inserts each having a lower section and a upper section hingedly attached thereto, said lower section and upper section cooperatively defining a third space for receiving an electrical cord, said inserts having on their outer circumferences multiple substantially ring shaped detent's, said detent's cooperating with multiple mating indent's formed on the interior surfaces of said jaw members, said multiple inserts each having a first and second position, said first position being open, said second position being closed forming said third space for receiving said electrical cord between them, said third space of said inserts cooperating with the outside contour of said electrical cord, said jaw members of first named opening of said lower and upper sections cooperating with the outside contour of said inserts, means to releaseably hold said upper and lower sections of said housing together whereby, when said socket of said first electrical cord and said plug of said second electrical cord are engaged and placed into said lower section of said housing and said first and second electrical cords, respectively, are surrounded and captured by said inserts with said inserts being inserted into said jaw section of said opening of said housing, and when said upper section of said housing is closed and releasably held in a mating relationship with said first named lower section of said housing and said jaw members assume their said second position, said socket and said plug of said electrical cord and said first and second electric cords are held together in a firm, secure manner.

2. The apparatus of claim 1 including a sheath, said sheath being made of a stretchable material, said sheath having an opening on each of its ends, said sheath being capable of being stretched over and capturing said socket and said plug and substantially sealing said socket and plug, making said socket and said plug substantially moisture and water tight, said sheath having a lip formed at each of its ends, said lips cooperating with a mating indent formed on the interior surface of said inserts to form a substantially water tight seal.

* * * * *